Sept. 19, 1944. W. L. KEEHN 2,358,578
PLUNGER TYPE BLIND RIVET
Filed Feb. 10, 1943
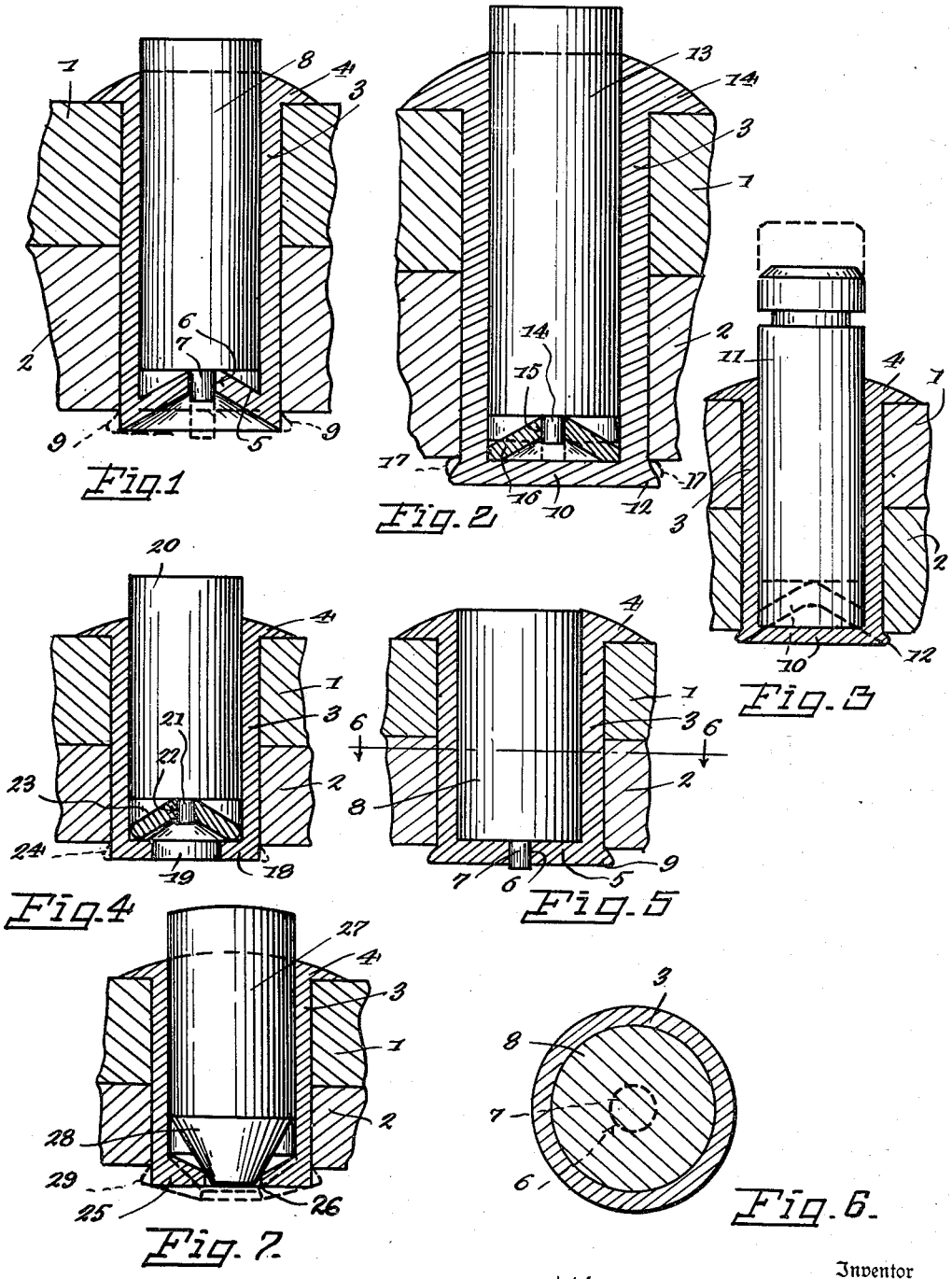
Inventor
Warner L. Keehn
By
Glenn L. Fish
Attorney Patented Sept. 19, 1944

2,358,578

UNITED STATES PATENT OFFICE 2,358,578

PLUNGER TYPE BLIND RIVET

Warner L. Keehn, Spokane, Wash.

Application February 10, 1943, Serial No. 475,424

5 Claims. (Cl. 85—40)

This invention relates to rivets and more particularly to a rivet intended for use in securing plates and the like together on airplanes, and in other places where it is impossible or very difficult to apply a backing tool while forming a head on an inserted rivet.

One object of the invention is to provide a rivet so formed that after it has been inserted through openings in plates to be secured, the inner end of the rivet may be formed with a head by merely striking the outer end of a plunger constituting an element of the rivet and slidably received in a sleeve constituting the body portion of the rivet.

Another object of the invention is to provide a rivet wherein the plunger which effects expansion of the inner end portion of the sleeve or tubular body of the rivet remains in the sleeve after expansion of the inner end thereof and serves as a reinforcement for the rivet.

Another object of the invention is to provide a rivet wherein the expansion plunger normally projects from the outer end of the sleeve or tubular body of the rivet so that it may be easily struck with a hammer when a head is to be formed at the inner end of the sleeve, the outer end of the plunger being flush with the surface of a head at the outer end of the sleeve after formation of the inner head so that no obstruction will be formed by a protruding outer end of the plunger.

Another object of the invention is to so form the rivet that when the expansion plunger is driven inwardly, a lug at its inner end will be gripped and outward movement of the plunger prevented.

Another object is to provide a blind rivet which is simple in construction, easy to apply, and very efficient in operation.

In the accompanying drawing:

Fig. 1 is a sectional view showing a rivet of the improved construction applied and ready to have a head formed at its inner end, the inner head being indicated by dotted lines.

Fig. 2 is a sectional view showing a rivet of modified formation applied and formed with an inner head.

Fig. 3 is a sectional view illustrating a step in the application of a rivet of the construction shown in Fig. 2.

Fig. 4 is a sectional view illustrating another modified form of rivet.

Fig. 5 is a sectional view showing a rivet of the form illustrated in Fig. 1, applied and formed with an inner head.

Fig. 6 is a transverse sectional view on the line 6—6 of Fig. 5.

Fig. 7 is a sectional view of another modified form of rivet.

This improved rivet is employed as a fastener for clamping plates 1 and 2 together in tight face to face engagement with each other and is particularly intended for use as a fastener for plates constituting elements of a wing or other portion of an airplane where the inner end of a rivet cannot be readily reached for backing up a rivet while forming a head at the inner end thereof.

The rivet has a hollow body or cylinder 3 of a length adapting it to pass through registering openings formed through the two plates and protrude from the inner plate when the clamping flanged head 4 about the outer end of the cylinder is in close contacting engagement with the outer plate. The inner end of the cylinder is formed with a head 5 which, in the form of rivet illustrated in Fig. 1, initially is of conical formation and projects into the inner end portion of the cylinder. This conical head is formed with an opening 6 at its apex to receive a stem or lug 7 projecting from the center of the inner end of a plunger 8 which is of a diameter adapting it to fit snugly into the cylinder and of such length that its outer end portion will project from the open outer end of the cylinder. The plunger is formed of solid metal and, when its outer end is struck with a hammer, the plunger will be driven inwardly and exert pressure against the apex of the head. This will cause the head to be flattened and expanded radially until the outer end of the plunger is flush with the outer end of the cylinder and the head flattened as indicated by dotted lines in Fig. 1 and shown in Fig. 5. Referring to these figures, it will be seen that, as the head is flattened, its surrounding portions of the inner end of the cylinder are extended to form a clamping flange 9 which bears against the inner plate 2 and causes the plates to be firmly gripped and clamped between the flanged head 4 and the clamping flange. It should also be noted that as the head is flattened, the opening 6 will be constricted about the stem or lug 7 and the lug firmly gripped by the head. Therefore, the plunger will be held against outward movement and it will constitute a solid core serving to reinforce the cylinder and form of the plunger and the cylinder a substantially solid rivet.

In Figs. 2 and 3 there has been shown an embodiment of the invention wherein the cylinder is formed with a solid head 10 which initially projects inwardly, as indicated by dotted lines in Fig. 3. When the rivet is applied, it is passed through the registering openings in the plates and a tool 11 then fitted into the cylinder and its outer end struck with a hammer to flatten the head. The head will then be radially expanded and a clamping flange 12 formed about the inner end of the cylinder. The tool 11 is then withdrawn and a plunger 13 inserted in the cylinder. This plunger is provided with a stem or lug 14 at the center of its inner end which fits into an opening 15 formed at the apex of a conical disc 16 which has its periphery so shaped that it bears against walls of the cylinder about the inner surface of the head. The plunger projects from the outer end of the cylinder when it is inserted into the cylinder and, when the protruding outer end of the plunger is struck with a hammer, it will be forced inwardly and the disc flattened against the head. As the disc is flattened it is radially expanded and pressure is applied to walls of the cylinder to bulge the same outwardly and form an auxiliary flange or bead 17 which is disposed between the flange 12 and the outer surface of plate 2 and assures tight clamping grip upon the two plates.

Fig. 4 illustrates another modified form of rivet wherein the cylinder is formed at its inner end with a head 18 having a large opening 19 at its center. The plunger 20 is similar to the plunger 13 and, at its inner end, carries a stem 21 fitting in an opening 22 at the apex of a conical disc 23. This disc bears against the head 18 and surrounding portions of the annular wall of the cylinder and, when the plunger is driven inwardly by striking its outer end with a hammer, the disc will be flattened and radially expanded to form a clamping head or flange 24 about the inner end of the cylinder.

Fig. 7 illustrates another modified form of rivet wherein the cylinder is formed at its inner end with a head 25 having a large opening 26 at its center. This head is inwardly reduced in thickness from walls of the cylinder to the opening to form the head with a sloping inner surface. A plunger 27 is fitted into the cylinder and is formed with a tapered inner end portion or nose 28 having its end engaged in the opening 26. As the plunger 27 is driven inwardly the frusto-conical inner end portion or nose of the plunger causes the head 25 to be bulged outwardly and also radially expanded to form a clamping flange 29 about the inner end of the cylinder. This flange overlaps the plate 2 and the two plates will be gripped between the flange and flanged head at the outer end of the cylinder and firmly clamped against each other.

Having thus described the invention, what is claimed is:

1. A blind rivet comprising a cylinder open at its outer end and provided with a flanged head about its open outer end, a member at the inner end of said cylinder, said member being initially cone-shaped and projecting toward the outer end of the cylinder and formed with an opening at its apex, and a plunger for applying pressure to the apex of the conical member to expand the said member and the inner end of the cylinder radially and form a clamping flange about the inner end of the cylinder, said plunger being slidably received in the cylinder through the outer end thereof and having a stem at its inner end engaged in the opening of the said member.

2. A blind rivet comprising a cylinder open at its outer end and provided with a flanged head about its open outer end, a head at the inner end of said cylinder, said head being initially cone-shaped and projecting into the cylinder and formed with an opening at its apex, and a plunger slidably received in said cylinder and having a stem at its inner end engaged in the opening of the head, said plunger initially protruding from the outer end of the cylinder whereby the plunger may be driven inwardly and when driven inwardly flattening and radially expanding the head to form a clamping flange about the inner end of the cylinder.

3. A blind rivet comprising a cylinder open at its outer end and provided with a flanged head about its open outer end, a head at the inner end of said cylinder, said head being initially cone-shaped and projecting into the cylinder and formed with an opening at its apex, and a plunger slidably received in said cylinder and having a stem at its inner end engaged in the opening of the head, said plunger initially protruding from the outer end of the cylinder whereby the plunger may be driven inwardly and when driven inwardly flattening the head to radially expand the inner end of the cylinder and form a clamping flange about the cylinder, the head when flattened gripping said stem to hold the plunger in the cylinder.

4. A blind rivet comprising a cylinder open at its outer end and provided with a flanged head about its open outer end, a head at the inner end of said cylinder, a plunger of a diameter adapting it to fit snugly into said cylinder, a stem at the inner end of said plunger, and a conical disc of a diameter adapting it to fit snugly into said cylinder with its periphery bearing against the head and walls of the cylinder, said disc having an opening at its apex receiving said stem, and said plunger when fitted into the cylinder initially protruding from the open outer end thereof whereby the plunger may be driven inwardly to flatten and radially expand walls of the cylinder and bulge the walls outwardly to form an auxiliary clamping member.

5. A blind rivet comprising a cylinder open at its outer end and provided with a flanged head about its outer end, a head at the inner end of said cylinder formed with an opening, a plunger slidably received in said cylinder, a stem at the inner end of said plunger, and a conical disc formed with an opening at its apex receiving said stem, the plunger and said disc being fitted into said cylinder with the periphery of the disc bearing against the head and walls of the cylinder and the outer end of the plunger protruding from the outer end of the cylinder whereby the plunger may be driven inwardly to flatten the disc and radially expand the head to form a clamping flange about the inner end of the cylinder.

WARNER L. KEEHN.